(No Model.)

D. J. TITTLE, Jr.

APPARATUS FOR DRESSING OFF THE COMMUTATORS OF DYNAMO ELECTRICAL MACHINES.

No. 379,344. Patented Mar. 13, 1888.

Witnesses:

Inventor:
DANIEL J. TITTLE JR.,
by
Attorney.

UNITED STATES PATENT OFFICE.

DANIEL J. TITTLE, JR., OF ALBANY, NEW YORK, ASSIGNOR TO EDWARD F. HACKETT, OF SAME PLACE.

APPARATUS FOR DRESSING OFF THE COMMUTATORS OF DYNAMO-ELECTRICAL MACHINES.

SPECIFICATION forming part of Letters Patent No. 379,344, dated March 13, 1888.

Application filed December 15, 1887. Serial No. 257,946. (No model.)

*To all whom it may concern:*

Be it known that I, DANIEL J. TITTLE, Jr., of the city and county of Albany, in the State of New York, have invented a new and useful Appliance for Dressing Off the Commutators of Dynamo-Electrical Machines, of which the following is a specification.

The object of my invention is to provide a simple and efficient appliance for dressing off the commutators of dynamo-machines without removing the armatures from their places, and I attain this object by the mechanism illustrated in the accompanying drawings, which are herein referred to and form part of this specification, and in which—

Figure 1:
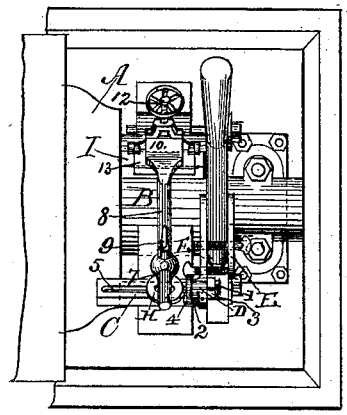
Figure 2:
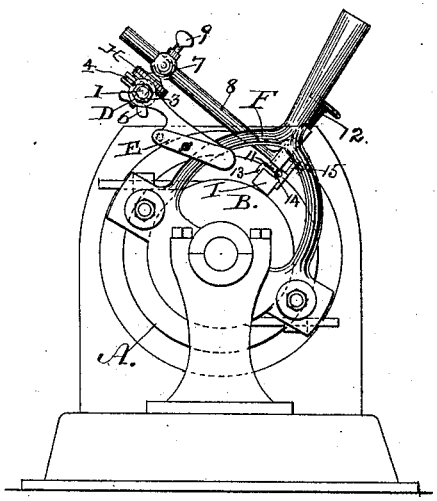
Figure 3:
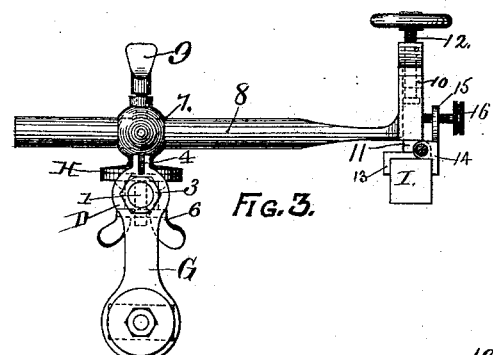
Figure 4:
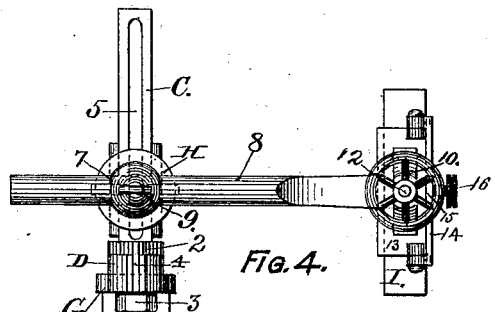

Figure 1 is a plan view of the commutator end of an Edison dynamo-machine with my appliance attached thereto. Fig. 2 is an end elevation of the same. Fig. 3 is an enlarged side elevation of my appliance as adapted to fit into the mortise of the rocker-arm of an Edison dynamo machine. Fig. 4 is a plan view, and Fig. 5 is a front elevation, of the same.

As represented in the drawings, A designates the armature of a dynamo-machine, and B the commutator, secured to said armature, so that the two will rotate as one piece. Said armature and commutator are old and well known. Therefore they do not form any part of this invention.

C is a slotted arm, which forms a guide on which my appliance is adjustably fixed. Said arm is provided with a stud, 1, which projects from one end in line with its longitudinal axis and which forms a center on which said arm may be rocked to effect its adjustment to a required position. A circular flange, 2, which is concentric with said stud, is provided with a series of teeth around its periphery for the purpose of affording means for locking said arm in position when adjusted to a required line. The stud 1 is screw-threaded on its outer end, and a screw-nut, 3, is fitted thereon to secure the arm C to its place in a hub, D, which, as shown in Figs. 1 and 2, forms part of a clamping device, E, by which my appliance can be secured to a rocker-arm, F, or other stationary part of a dynamo-machine, that is located sufficiently near the commutator B to make it available for that purpose.

Figure 5:
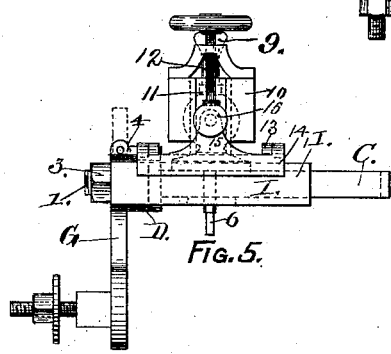

As shown in Figs. 3, 4, and 5, the hub D forms a part of an arm, G, which is fitted to enter a mortise in the rocker-arm F, which mortise is designed for the purpose of containing the brush-holder of the dynamo, said brush-holder having to be removed from the machine when my appliance is secured in the manner last described; but in both forms the hub D is provided with a latch, 4, that is fitted to engage in any of the spaces between the teeth on the periphery of the flange 2, so as to secure the arm C from turning on its axis. A sliding block, H, is fitted on the arm C, so as to be secured at the required point on said arm, and is provided with a screw-stem which passes through the slot 5 of said arm. A binding-nut, 6, engages on said screw-stem to effect the securing of said sliding block in place. On the upper side of said sliding block an eye, 7, is formed to receive a sliding bar, 8, which is arranged at right angles to the axis of the armature A and which is secured in place in the eye 7 by a set-bolt, 9. Said sliding bar is provided with a head, 10, in which a slide, 11, is fitted to receive a vertical movement by means of a feeding-screw, 12. The slide 11 has on its lower end an angled flange, 13, which forms the fixed jaw of a clamping device at that point. A movable jaw, 14, is hinged to the flange 13 to form the complementary part of said clamping device. Said movable jaw has a lug, 15, on its upper edge, and in said lug a screw, 16, is fitted to bear against the face of the slide 11 in such manner that it will force the movable jaw 14 to turn on its hinges and effect a clamping movement of said movable jaw.

I is an abrading-block or polisher, that is held in the clamping device at the lower end of the slide 11. Said abrading-block is preferably made in the form of a square bar, and it may be composed of abrading-stone, composition containing emery or other suitable abrading material, wood or other material covered with a suitable abrading material, or of any other material suited to such purpose.

The mode of operating my invention is as follows: The appliance being secured to the dynamo-machine, as hereinbefore described, with the abrading-block I adjusted to bear upon the full length of commutator B, the armature A is set in motion by the motive power used for operating it. The abrading-block is forced down by the feeding-screw 12. Then, by the rotative movement of the armature, the abrading-block I will be brought into contact with every part of the periphery of the commutator B until it is reduced to a smooth and even surface. Whenever, by reason of the surface of the commutator becoming greatly worn out of truth, it becomes necessary to remove considerable of the surface metal of the commutator, a scraper or cutting-tool can be fixed in the clamping device in place of the abrading-block, and thereby the surface of the commutator can be reduced to the required condition, to be finished by the abrading-block.

My invention is also adapted to dressing off the journals of shafts and other surfaces of rotating cylindrical bodies.

I claim as my invention—

1. The combination of an arm fitted to be secured to a fixed part of a dynamo-machine and having an open hub provided with a locking device for holding a rocking arm in position, a rocking arm fitted into said hub and provided with a toothed flange in which said locking device engages, an adjustable block attached to said arm and provided with means for securing an adjustable bar thereto, and an adjustable bar provided with a head which carries an adjustable slide, the latter being fitted to move at right angles to the axis of the adjustable bar and having a clamping device at its lower end, as and for the purpose herein specified.

2. The combination, with the elements enumerated in the first claim, of an abrading-block detachably fixed in the clamping device of the adjustable slide, substantially as and for the purpose herein specified.

DANIEL J. TITTLE, JR.

Witnesses:
WM. H. LOW,
S. B. BREWER.